Aug. 11, 1959 E. G. MILLIS 2,899,539

ELECTRONICALLY CONTROLLED BONDING MACHINE

Filed Nov. 1, 1956 3 Sheets-Sheet 1

INVENTOR

Edwin G. Millis

BY Stevens, Davis, Miller & Mosher

ATTORNEYS

Aug. 11, 1959 E. G. MILLIS 2,899,539

ELECTRONICALLY CONTROLLED BONDING MACHINE

Filed Nov. 1, 1956 3 Sheets-Sheet 2

SEE FIG. 1. FOR WAVE FORM LOCATIONS.

NOTE: AMPLITUDES NOT TO SCALE

INVENTOR
Edwin G. Millis

BY Stevens, Davis, Miller & Mosher
ATTORNEYS

Aug. 11, 1959 E. G. MILLIS 2,899,539

ELECTRONICALLY CONTROLLED BONDING MACHINE

Filed Nov. 1, 1956 3 Sheets-Sheet 3

INVENTOR
Edwin G. Millis

BY Stevens, Davis, Miller & Mosher
ATTORNEYS

United States Patent Office 2,899,539

Patented Aug. 11, 1959

2,899,539

ELECTRONICALLY CONTROLLED BONDING MACHINE

Edwin G. Millis, Dallas, Tex., assignor to Texas Instruments Incorporated, Dallas, Tex., a corporation of Delaware Application November 1, 1956, Serial No. 619,755

18 Claims. (Cl. 219—110)

The present invention relates to a method and apparatus for resistance welding and more particularly to a method and apparatus for providing a satisfactory bond between a gold wire and a semi-conductive body by resistance welding regardless of the size or resistivity of the gold wire and semi-conductive body or the location of the junction between them.

Resistance welding has been employed in the prior art to effect bonding of a gold wire to a semi-conductive body in the production of transistors and diodes. A current pulse of a predetermined duration is passed through the gold wire and semi-conductive body in series. The contact resistance between the gold wire and semi-conductive body is considerably greater than the resistance of the elements themselves and consequently heating of the regions adjacent the area of contact proceeds far more rapidly than heating of the other regions of the elements and produces selective melting and fusion of the former regions. The utilization of a pulse of predetermined duration for all welding operations regardless of the size and resistivity of the bar and wire has proven unsatisfactory, since the welding power thus delivered may be too large under one set of conditions resulting in damage to the bar and may be too small under another set of conditions, resulting in a defective weld. Variation of the welding interval in accordance with size and resistivity of the bar is not wholly satisfactory because of a further indeterminable variable introduced by the contact resistance between the wire and bar. The contact resistance bewteen the elements is a function of the contact pressure and the condition of the contacting surfaces neither of which can be determined with certainty. The contact resistance between the bar and the wire disappears, however, when these elements begin to melt and fuse and thereafter the power required to complete the weld may be accurately determined in accordance with the resistivity and size of the wire and bar and the location of their junction. The location of the junction between the wire and bar is of importance since it determines the portion of the resistance of the bar connected in the circuit.

In accordance with the present invention, satisfactory bonding of a gold wire to a bar of semi-conductive material by resistance welding is effected by determining the instant at which melting of the bar and wire in the region of their point of contact commences and thereafter continuing the welding current for a time interval required to supply sufficient power to complete the weld as determined by the resistivity and size of the bar and wire and the location of their area of contact. The initial resistance of the welding circuit; that is, load on the welding current generator, is directly related to the resistance of the bar, the resistance of the wire and the contact resistance all connected in series. Upon melting of the wire and bar in the region of their area of contact, the contact resistance disappears, considerably decreasing the resistance in the welding circuit and thereby increasing the load on the welding current generator.

The increased load on the welding current generator increases the voltage drop in the generator and sharply decreases its output voltage. The sharp decrease in output voltage of the welding current generator is indicative of the time at which melting of the bar and wire commences and is employed to trigger a timing circuit which terminates the welding current at a predetermined time after its energization.

More specifically a phantastron generator, triggered by a push-button controlled relay circuit, is employed to produce a sawtooth output voltage which is amplified by a power amplifier and applied to the semi-conductive bar and gold wire in series. A differentiating circuit is connected across the power amplifier output circuit; that is, shunting the welding load, and produces a sharp positive pulse when the welding voltage decreases sharply as a result of the melting of the bar and wire in their contact region. The sharp positive pulse is shaped and amplified and applied to a second phantastron generator. The period of the sawtooth voltage output of the second phantastron is adjusted in accordance with the resistivity and size of the bar and wire and the location of the region of contact so that the sawtooth voltage terminates at the time that it is desired to terminate welding. The sawtooth voltage is differentiated so as to produce a sharp voltage pulse at the end of its period, this pulse being suitably shaped and then applied to the first phantastron generator to terminate its output voltage. The plate voltage to the amplifier or amplifiers in the second phantastron circuit may be delayed for a short interval to prevent premature firing by noise switching transients generated by the push-button operated relay or relays.

Although the invention is particularly applicable to and is explained with reference to bonding a gold or other wire to a semi-conductive body as one step in the manufacture of a transistor or diode, the invention is also applicable to the bonding of other objects subject to variations in their size, resistivity, location of their point of contact and/or their contact resistance.

It is an object of the present invention to provide an apparatus and method of bonding a wire to a semi-conductive body by resistance welding which apparatus produces satisfactory welds for a wide range of sizes of semi-conductive bars and wires having varying resistances and different locations of their junctions.

It is another object of the present invention to provide an apparatus and method for bonding wires to semi-conductive bars by resistance welding wherein welding current is maintained for a predetermined time interval after commencement of melting of the bar and wire in their contact region.

Another object of the present invention is to provide an apparatus and method for bonding two objects by resistance welding wherein a welding current is passed through the objects in series, and the welding current is terminated a predetermined time interval after the objects begin to fuse.

Yet another object of the present invention is to provide a first phantastron generator for supplying a welding current to two objects in series and to employ a second phantastron generator, energized when the objects begin to melt, to terminate operation of the first phantastron at a predetermined time after energization of the second phantastron generator.

It is another object of the present invention to provide a switch operated relay for energizing a first phantastron generator which supplies a welding current to two or more objects connected in series, a second phantastron generator energized when the objects begin to melt at their areas of contact and circuits for terminating the operation of the first phantastron oscillator at the end of the period of the output voltage of the second phantastron generator.

It is still another object of the present invention to provide a switch operated relay for energizing a first phantastron generator which develops a voltage applied across series connected objects to be welded, voltage sensing and amplifying circuits for energizing a second phantastron generator when the voltage across the objects decrease sharply, circuits for deenergizing the first phantastron at the end of the period of the output voltage of the second phantastron generator; and circuits for delaying the application of the supply voltage to the amplifying circuits for a predetermined time interval after operation of the relay thereby to prevent premature firing of the second phantastron by switching transients.

The above and still further objects, features and advantages of the present invention will become apparent upon consideration of the following detailed description of one specific embodiment thereof, especially when taken in conjunction with the accompanying drawings, wherein.

Figure 1:
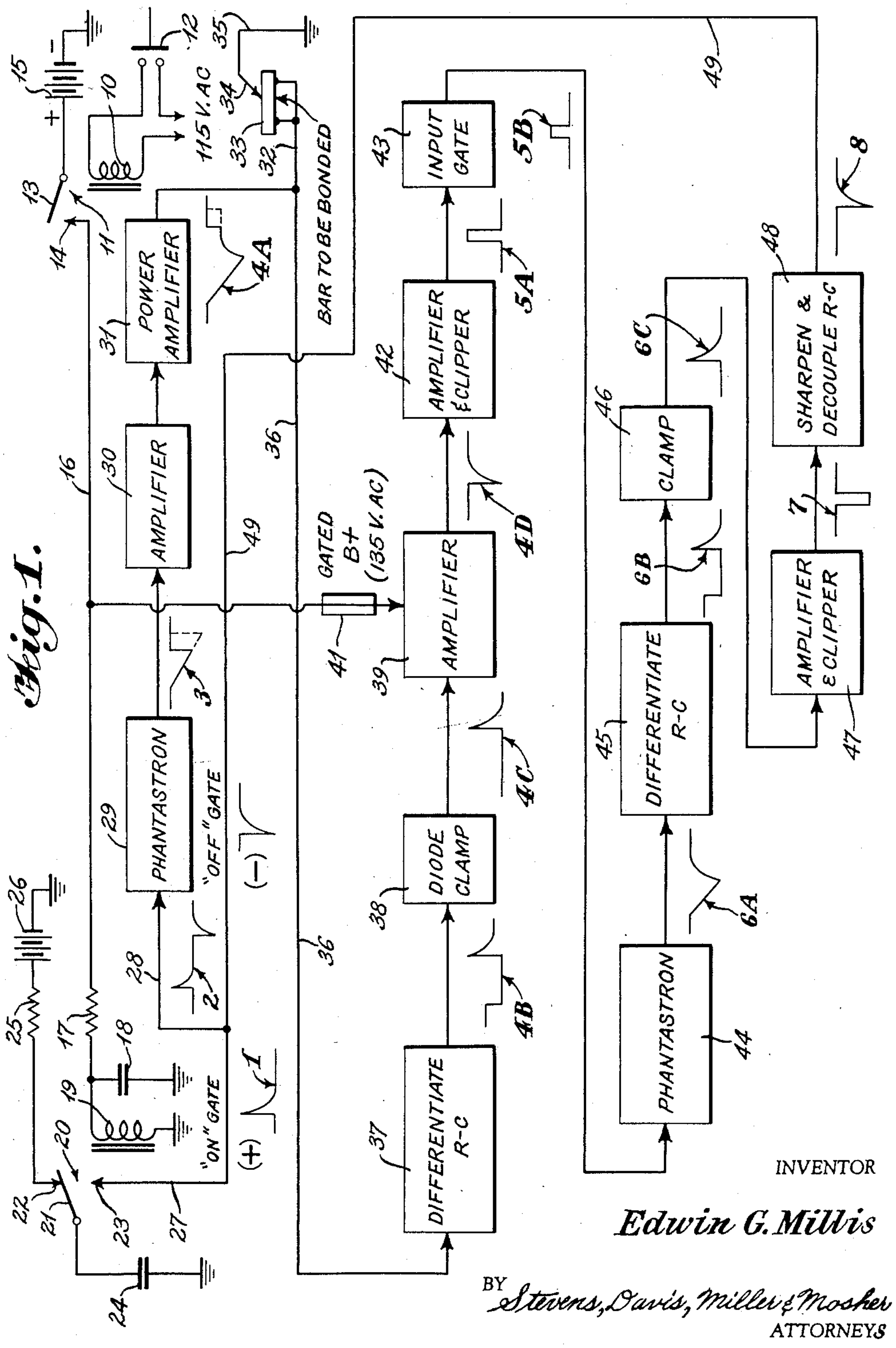
Figure 1 is a schematic block diagram of the welding circuits of the present invention.
Figure 3:
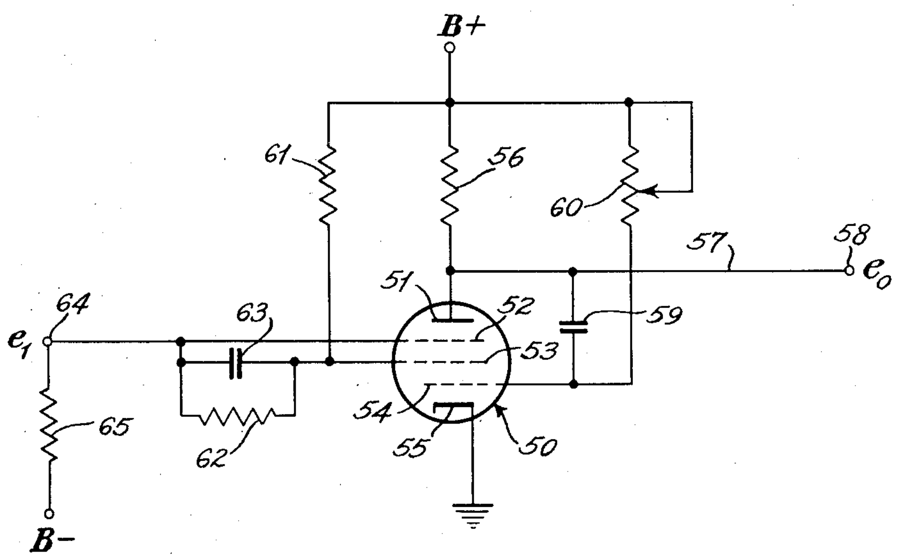
Figure 3 is a schematic wiring diagram of a phantastron generator which may be employed in the circuits of Figure 1.

Referring specifically to Figure 1 of the accompanying drawings, a coil 10 of an electromagnetic relay 11 is connected in series with a push-button switch 12, conventionally illustrated, across a suitable source of electric power. The relay 11 further includes a movable contact 13 and a stationary contact 14, the movable contact 13 being connected through a source of direct voltage 15, which may be a battery or a rectifier power supply, to a source of reference potential. The source of reference potential may be and is hereinafter referred to as ground. The stationary contact 14 of the relay 11 is returned to ground through a series circuit comprising a lead 16, a current limiting resistor 17 and a capacitor 18 connected in parallel with a coil 19 of an electromagnetic relay 20. The relay 20 further includes a movable contact 21 and two stationary contacts 22 and 23, the movable contact 21 normally engaging the contact 22 and being electrically connected to ground through a capacitor 24. The stationary contact 22 of the relay 20 is connected through a current limiting resistor 25 to a suitable source 26 of direct current while the stationary contact 23 of the relay 20 is connected via a lead 27 and thence over a lead 28 to the input or triggering circuit of a phantastron voltage generator 29. The phantastron is a well-known circuit element for generating a sawtooth voltage wave having a controllable and stable period. The phantastron generator employed in the present invention is illustrated in Figure 3 of the accompanying drawings and is subsequently described in conjunction with that figure. The sawtooth voltage generated by the phantastron generator 29 is passed through a voltage amplifier 30 to a power amplifier 31. The output signal of the amplifier 31 is applied over a lead 32 to the two ends of a bar 33 which represents the body of semi-conductive material to which a gold wire 34, conventionally illustrated, is to be bonded by resistance welding. The gold wire 34 is physically in contact with the bar 33 and is electrically connected to ground via a lead 35.

Proceeding now to a description of the apparatus thus far described, upon closure of the switch 12, the relay 11 is energized and closes its contacts 13 and 14 thereby connecting the voltage source 15 to the lead 16. After a short time delay provided by the resistor 17 and capacitor 18, the relay 20 is energized and closes the movable contact 21 to the stationary contact 23 of the relay 20. During intervals in which the relay 20 is deenergized the capacitor 24 is connected through movable contact 21 and stationary contact 22 to the voltage source 26 and is charged thereby. Upon energization of relay 20 the capacitor 24 dissipates its charge over leads 27 and 28 and through the input circuit of the phantastron generator 29 to produce a voltage pulse having a peaked waveform as indicated by the numeral "1" in Figures 1 and 2. The various waveforms generated by the respective circuit elements are illustrated in Figure 1 adjacent these elements and are illustrated in Figure 2 with a common time base to indicate clearly their respective times of occurrence.

Continuing with the description of operation of the elements thus far described, the relay 20 must be maintained energized for a predetermined length of time, independent of the length of time the switch 12 is held closed, to insure the production of a pulse on lead 27 of sufficient duration to fire the phantastron generator 29. This is accomplished by the capacitor 18 which discharges through the coil 19 of relay 20 after the relay 11 is released.

Figure 2:
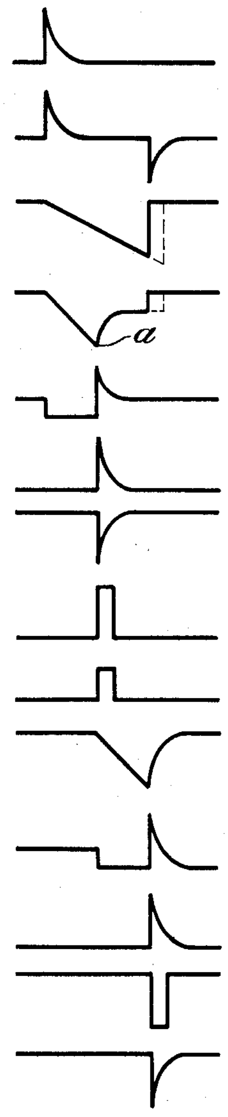
Figure 2 is a graph of various voltage waveforms generated by the circuits of Figure 1.

The phantastron generator 29, upon being triggered by the voltage pulse appearing on lead 28 produces a sawtooth voltage having a period indicated by the dotted lines of waveform 3, illustrated in Figure 2, in the absence of a cut-off pulse. The sawtooth voltage thus generated is amplified by the voltage amplifier 30 and the power amplifier 31 and produces a welding current flow through the bar 33, the juncture of the bar 33 and gold wire 34 and the wire 34 in series to ground thereby producing heating of these elements. Maximum heating occurs at the point of contact to effect welding of the elements.

The utilization of a fixed welding interval as determined by the phantastron generator 29 has proven unacceptable due to variation of the series resistance of the welding circuit with size and resistivity of the bar 33 and wire 34, location of the junction of the bar 33 and wire 34 and contact resistance between the two elements. The power required to be dissipated in the weld region to effect a satisfactory weld is substantially constant regardless of size of the bar, contact resistance and location of the junction, but these factors, because of their effect on the magnitude of the current, do effect the time interval required to supply the necessary energy. It has been found that where the bars to be welded vary greatly in size and a fixed welding interval is employed, the weld power supplied is insufficient to produce a satisfactory bond between large semi-conductive bars and the gold wire whereas the power supplied to small bars is too great and frequently damages them. A simple adjustment of the welding interval in accordance with size of the bar is not a satisfactory solution of the problem due to complications arising from unpredictable variations in the contact resistance between the bars and the gold wires resulting from variations in the contact pressure and the condition of the contacting surfaces. This latter variable cannot be determined empirically and consequently introduces an uncontrollable and unpredictable variable into the determination of welding time. The contact resistance, however, substantially disappears upon the commencement of melting of the materials at the point of contact at which time the materials begin to fuse. Thereafter, the resistance to current flow is a function of resistance of the bar and wire and placement of the point of contact which factors may be estimated to a fair degree of accuracy. The effect of the disappearance of the contact resistance when the materials begin to melt is to divide the total welding time into two distinct intervals, the first interval extending from the initiation of current flow to the beginning of fusion of the materials and the second interval extending from this latter occurrence to the end of the welding operation. The second interval is the only one of importance with respect to the actual welding operation since it is during this interval that welding occurs. With the foreknowledge of the power required for a satisfactory weld, the coefficient of resistance of the bar and its size and the position of the point of contact between the bar and the gold wire, the required duration of the second interval may be accurately determined. The current applied during the first interval serves only to heat the materials at their point of contact to their melting temperature and does not effect the total welding power required to be applied during the second interval. Consequently, the duration of the first interval is of importance only in that its termination marks the beginning of the second interval which must be accurately controlled.

In accordance with the present invention the termination of the first interval is determined by detecting a sudden variation in the magnitude of the output voltage of the amplifier 31 when the materials of the bar 33 and wire 34 begin to melt. Referring specifically to waveform 4A of Figure 2 of the accompanying drawings which represents the voltage at the output of amplifier 31, the voltage rises steadily to a maximum indicated by the letter "*a*" and then falls rapidly. The sudden decline in the output voltage of the amplifier 31, as indicated by waveform 4A, results from an increase in the load on the amplifier 31 when the bar 33 and wire 34 begin to fuse. At this time the large contact resistance substantially disappears, and greatly reduces the series impedance of the welding circuit, thereby loading the amplifier 31. The circuitry employed for detecting the sudden change in the voltage applied to the bar 33 and wire 34 and for accurately timing the second interval is now described with further reference to Figure 1 of the accompanying drawings.

The voltage appearing on the lead 32 is applied over a further lead 36 to an R–C differentiating circuit 37 connected in parallel with the welding load. The output voltage derived by the circuit 37 is applied through a ground-returned clamp diode 38 to a voltage amplifier 39. The B+ supply for the amplifier 39 is derived from the lead 16, being applied to the amplifier via a lead 40 and an R–C or other suitable time-delay circuit 41 for purposes to be subsequently explained. The output voltage from the amplifier 39 is passed through an amplifier and clipper 42 and through an input gate 43 to a second phantastron generator 44. The sawtooth wave generated by phantastron 44 is passed through a second R–C differentiating network 45, ground-returned clamp diode 46, amplifier and clipper 47 to an R–C sharpening and decoupling network 48. The output voltage pulse generated by the network 48 is applied over a lead 49 to the lead 28 which feeds the input circuit of the first phantastron generator 29.

Proceeding now to a description of the operation of the circuit elements 37 through 48, the differentiating circuit 37 produces a voltage having a waveform 4B. The waveform 4B comprises a negative square wave portion generated during the steadily rising portion of the waveform 4A and a sharp positive pulse produced when the voltage across the welding load decreases as a result of commencement of fusion of bar 33 and gold wire 34. The negative square wave portion of the output voltage of circuit 37 is removed by the ground-returned clamp diode 38 and the remaining positive pulse 4C is amplified by the amplifier 39. This voltage, indicated by waveform 4D, is amplified and clipped by amplifier and clipper 42 to produce a positive square wave pulse 5A which is clipped to a predetermined and fixed amplitude by the input gate 43. This latter square wave pulse indicated by waveform 5B triggers the second phantastron generator 44 which produces a sawtooth output voltage, the period of which determines the duration of the second time interval; that is, the interval required to effect complete welding of the bar 33 and gold wire 34. The leading edge of the square wave voltage pulse applied to the phantastron 44 occurs at approximately the instant at which the bar and wire begin to fuse and as desired, the phantastron 44 is fired at the termination of the first interval of operation. Consequently, by predetermining the period of the output voltage of phantastron 44 in accordance with the size of the bar 33 and the location of the contact between the bar 33 and the gold wire 34 and terminating the output voltage of the phantastron 29 at the end of this period, the power required to produce a satisfactory weld may be accurately controlled. The termination of the output voltage from the phantastron 29 at the end of the output voltage produced by the phantastron 44 is effected by the circuits 45 through 48. The differentiating circuit 45 produces a sharp positive voltage pulse 6B at the end of the sawtooth voltage wave 6A, and the clamp diode 46 removes the negative square portion of the voltage resulting from the steadily rising portion of the sawtooth wave as illustrated by wave from 6C. The amplifier and clipper 47 produce a narrow negative square wave pulse 7 of a predetermined and fixed amplitude which is converted to a sharp negative pulse 8 by the R–C sharpening and decoupling circuit 48. This negative pulse represented by waveform 8 has a leading edge which corresponds in time to the trailing edge of the sawtooth output voltage of the phantastron 44. The negative pulse is applied over leads 49 and 28 to the input circuit of the plantastron 29 and gates this generator off at a time indicated by the solid vertical line of waveform 3 of Figure 2.

As a practical matter, the circuit elements 37 through 43 and 45 through 48 introduce a delay between the time of occurrence of the events they sense and the generation of the control voltages produced in dependence upon these events. However, the delays introduced by these elements are measured in microseconds whereas the total welding time is measured in milliseconds and therefore the delays introduced by elements 37 through 43 and 45 through 48 may be disregarded.

The plate supply voltage to the amplifier 39 is delayed by the delay network 41 to prevent early firing of the second phantastron 44 due to switching transients generated by the various relays in the system. Maintaining the amplifier 39 quiescent for a short interval after operation of the relays allows sufficient time for the noise transients to be dissipated before the circuit to the phantastron 44 is opened. However, the circuit 41 must not delay the application of the plate voltage to the amplifier 39 for an interval as large as the interval between initiating of a welding cycle and the instant at which the bar and wire begins to melt.

It is apparent from the above that the circuit elements 37 through 43 provide an accurate indication of the instant at which the bar 33 and wire 34 begin to melt and therefore determine precisely the beginning of the second time interval. The second phantastron 44 accurately times the second interval and the elements 45 through 48 provide an accurate indication of the termination of the second interval. The second interval may be predetermined by adjusting the period of the voltage generated by the phantastron 44, so as to continue the welding current after commencement of melting of the bar 33 and wire 34 for a sufficient length of time as determined by the size of the bar 33 and the location of the junction of the bar 33 and wire 34 to effect a satisfactory weld. It should be noted that the period of the voltage produced by the phantastron 29 should be adjusted to be at least as long and preferably longer than the total possible operating period to insure that the welding current is not terminated prior to the time dictated by the phantastron 44.

An example of a phantastron generator which may be employed as elements 29 and 44 of Figure 1 is illustrated in Figure 3 of the accompanying drawings. The phantastron is screen-coupled and includes a vacuum tube 50 having an anode 51, a suppressor grid 52, a screen grid 53, a control grid 54 and a grounded cathode 55. The anode 51 is connected through a load resistor 56 to a source of plate potential and over a lead 57 to an output voltage terminal 58. A capacitor 59 is connected between the lead 57 and the control grid 54 and the control grid is further connected through a variable timing resistor 60 to the plate voltage supply. The screen grid 53 is connected through a resistor 61 to the plate voltage source and through parallel connected resistor 62 and capacitor 63 to the suppressor grid 52. The suppressor grid 52 is connected directly to an input voltage terminal 64 and the input terminal is returned to a negative voltage source through a resistor 65, which may comprise the cathode load resistor of the input gate 43.

The screen-coupled phantastron is a combination of a Van der Pol oscillator and a Miller integrator. The suppressor grid 52 is coupled to the screen grid 53 through the resistor capacitor circuit 62—63 as in the Van der Pol oscillator but the biases are adjusted so that the circuit must be triggered. The anode 51 and control grid 54, interconnected by the capacitor 59, constitute a Miller integrator circuit which effects the generation of the sawtooth output voltage. The plate voltage is fed back to the control grid 54 gradually increasing its voltage until the plate voltage falls to its lowest possible value. At this time the screen grid current suddenly increases decreasing the screen grid voltage which causes the suppressor grid voltage to decrease thereby cutting off the plate current. The period of the sawtooth wave is determined by the time required for the plate 51 to attain its lowest possible voltage which is controlled by the bias applied to the control grid 54. The bias applied to the control grid is determined by the setting of the variable timing resistor 60. Where the phantastron of Figure 3 is employed as the generator 29 of Figure 1, the resistor 60 is adjusted so that the period of the sawtooth voltage is at least as long and preferably longer than the contemplated elapsed welding cycle. Where the phantastron of Figure 3 is employed as the generator 44 the resistor 60 is adjusted in accordance with the size of the bar 33 and the junction of the bar 33 and gold wire 34, so that sufficient power is applied during the second interval of the welding cycle to weld the bar and wire without overheating the bar and thereby damaging it.

The phantastron illustrated in Figure 3 is an example of one phantastron circuit which may be satisfactorily employed in the apparatus of the present invention. Other phantastron circuits may be employed and it is not intended to limit the invention to the particular circuit illustrated.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. An apparatus for bonding two objects by resistance welding comprising means for passing an electric current through the objects in series, sensing means for determining the commencement of fusion of the objects, and timing means responsive to said sensing means for terminating the electric current at a predetermined time after the objects begin to fuse.

2. An apparatus for bonding two abutting objects by resistance welding comprising generator means for producing welding voltage, circuit means adapted to connect the welding voltage across the abutting objects in series, sensing means for generating a signal when the abutting objects begin to fuse, timing means for terminating the welding voltage a predetermined time after energization of said timing means, and means for applying said signal to said timing means to energize said timing means.

3. An apparatus for bonding two abutting objects by resistance welding comprising a generator for producing a welding voltage, circuit means adapted to connect the welding voltage across the abutting objects in series, sensing means for generating a first electrical signal in response to a reduction in the electrical series resistance of the objects, and timing means responsive to said sensing means for terminating said welding voltage at a predetermined time after generation of said electrical signal.

4. An apparatus for bonding abutting objects by resistive welding comprising generator means for generating a welding voltage, a pair of leads, means for applying the welding voltage across said leads, means adapted to connect the objects in series between said leads, sensing means connected across said leads to produce an electric signal in response to a reduction in welding voltage across said leads, and means responsive to said sensing means for terminating the welding voltage at a predetermined time after generation of said electric signal.

5. An apparatus for bonding two abutting objects by resistance welding comprising a generator for producing a welding voltage, circuit means for applying the welding voltage across the abutting objects in series, sensing means for generating a first electrical signal in response to a reduction in the electrical series resistance of the objects, timing means, means for applying said electric signal to said timing means, said timing means including means for generating a second electrical signal at a predetermined time after generation of said first electrical signal and means for terminating the welding voltage in response to generation of said second electrical signal.

6. An apparatus for bonding two abutting objects by resistance welding comprising generator means for generating a welding voltage, circuit means for connecting the welding voltage across said objects in series, switch means for initiating operation of said generator means, sensing means for producing a first electric signal in response to a reduction in the electrical series resistance of said objects, timing means responsive to said sensing means for producing a second electric signal a predetermined time after generation of said first electric signal and means for terminating operation of said generator means in response to said second electric signal.

7. An apparatus for bonding two abutting objects by resistance welding comprising generator means for generating a welding voltage, a pair of leads, means for applying the welding voltage across said leads, said objects being connected in series across said leads, switch means for initiating operation of said generator means, voltage sensing means for generating an electric signal in response to a reduction in welding voltage across said leads, and means responsive to said voltage sensing means for terminating operation of said generator means a predetermined time after generation of said electric signal.

8. An apparatus for bonding two abutting objects by resistance welding comprising generator means for generating a welding voltage, a pair of leads, means for applying the welding voltage across said leads, said leads being adapted to apply the welding voltage across the objects in series, voltage sensing means connected between said leads, said voltage sensing means generating a first electric signal in response to a reduction in welding voltage across said leads, timing means for producing a second electric signal a predetermined time after energization of said timing means, circuit means for energizing said timing means in response to generation of said first electric pulse and means for terminating operation of said generating means in response to said second electric signal.

9. The combination in accordance with claim 8, wherein said voltage sensing means comprises an electrical differentiating network.

10. The combination in accordance with claim 8, wherein said generator means comprises first pulsing means for producing a waveform having a period at least as long as the maximum time interval between initiation and termination of operation of said generator means.

11. The combination in accordance with claim 10, wherein said timing means comprises second pulsing means for producing a waveform having a maximum period which is short compared with the period of the waveform produced by said first pulsing means and means for differentiating the waveform produced by said second pulsing means to generate said second electric signal.

12. The combination in accordance with claim 11, wherein said pulsing means are sawtooth signal generators.

13. An apparatus for bonding plural objects by resistance welding comprising a first sawtooth signal generator, switch means for initiating operation of said sawtooth signal generator, a pair of leads, circuit means for applying the sawtooth signal to said pair of leads, means adapted to connect the objects to be bonded between said leads in series, an electrical differentiating circuit means connected between said leads to generate a pulse upon a decrease in voltage across said leads, a second sawtooth signal generator, means for initiating operation of said second sawtooth signal generator in response to pulses generated by said electrical differentiating circuit means, means for differentiating pulses produced by said second sawtooth signal generator to produce a control pulse and means for terminating operation of said first sawtooth signal generator in response to generation of said control pulse.

14. The combination in accordance with claim 13, further comprises means for preventing operation of said second sawtooth signal generator for a predetermined time interval after initiating operation of said first sawtooth signal generator.

15. The method of bonding objects by resistance welding which comprises the steps of passing an electric current through the objects in series, determining the instant at which the objects begin to fuse, and terminating the electric current a predetermined time interval after fusion commences.

16. The method of bonding objects by resistance welding which comprises the steps of passing an electric current through the objects in series, detecting a decrease in voltage across the objects and terminating the electric current at a predetermined time after detection of the voltage decrease.

17. The method of bonding objects by resistance welding comprising the steps of passing an electric current through the objects in series, detecting a decrease in the series resistance across the objects and terminating the electric current at a predetermined time after detection of a decrease in the series resistance of the objects.

18. The method of bonding objects by resisting welding comprising the steps of passing an electric current through said objects in series, detecting a decrease in voltage across said objects, triggering a time delay circuit by said decrease in voltage, and terminating said electric current by an output pulse from said time delay circuit.

References Cited in the file of this patent

UNITED STATES PATENTS

| | | |
|---|---|---|
| 2,433,964 | Tarbox et al. | Jan. 6, 1948 |
| 2,433,967 | Van Sciver | Jan. 6, 1948 |
| 2,472,041 | Davies | May 31, 1949 |
| 2,472,042 | Davies | May 31, 1949 |